United States Patent [19]

Delatorre

[11] 4,434,451

[45] Feb. 28, 1984

[54] PRESSURE SENSORS

[76] Inventor: Leroy C. Delatorre, 10 Crestwood, Sugarland, Tex. 77478

[21] Appl. No.: 289,483

[22] Filed: Aug. 3, 1981

Related U.S. Application Data

[62] Division of Ser. No. 89,162, Oct. 29, 1979, Pat. No. 4,322,775.

[51] Int. Cl.³ .......................... H01G 7/00; H01G 5/34
[52] U.S. Cl. ....................................... 361/283; 73/718
[58] Field of Search ............... 361/283, 278, 274, 282; 73/718, 724

[56] References Cited

U.S. PATENT DOCUMENTS 3,858,097 12/1974 Polye ..................................... 361/283
3,859,575 1/1975 Lee ........................................ 361/283
4,196,632 4/1980 Sikorra ............................. 361/283 X Primary Examiner—Donald A. Griffin

[57] ABSTRACT

A capacitance type pressure transducer for pressure measurements for accurate pressurements under differing temperature and pressure conditions having a mechanical construction wherein the displacement characteristics of the transducer as a function of temperature are equated to a compensating change in capacitance as a function of temperature so that changes in temperature do not change the accuracy of the transducer response; a mechanical configuration of the transducer to provide equivalent thermal pathways in the transducer to equalize transient temperature effects upon the transducer and a mechanical design to provide a structural capacitance relationship basically independent of gravitational effects due to positional location of the transducer.

21 Claims, 8 Drawing Figures

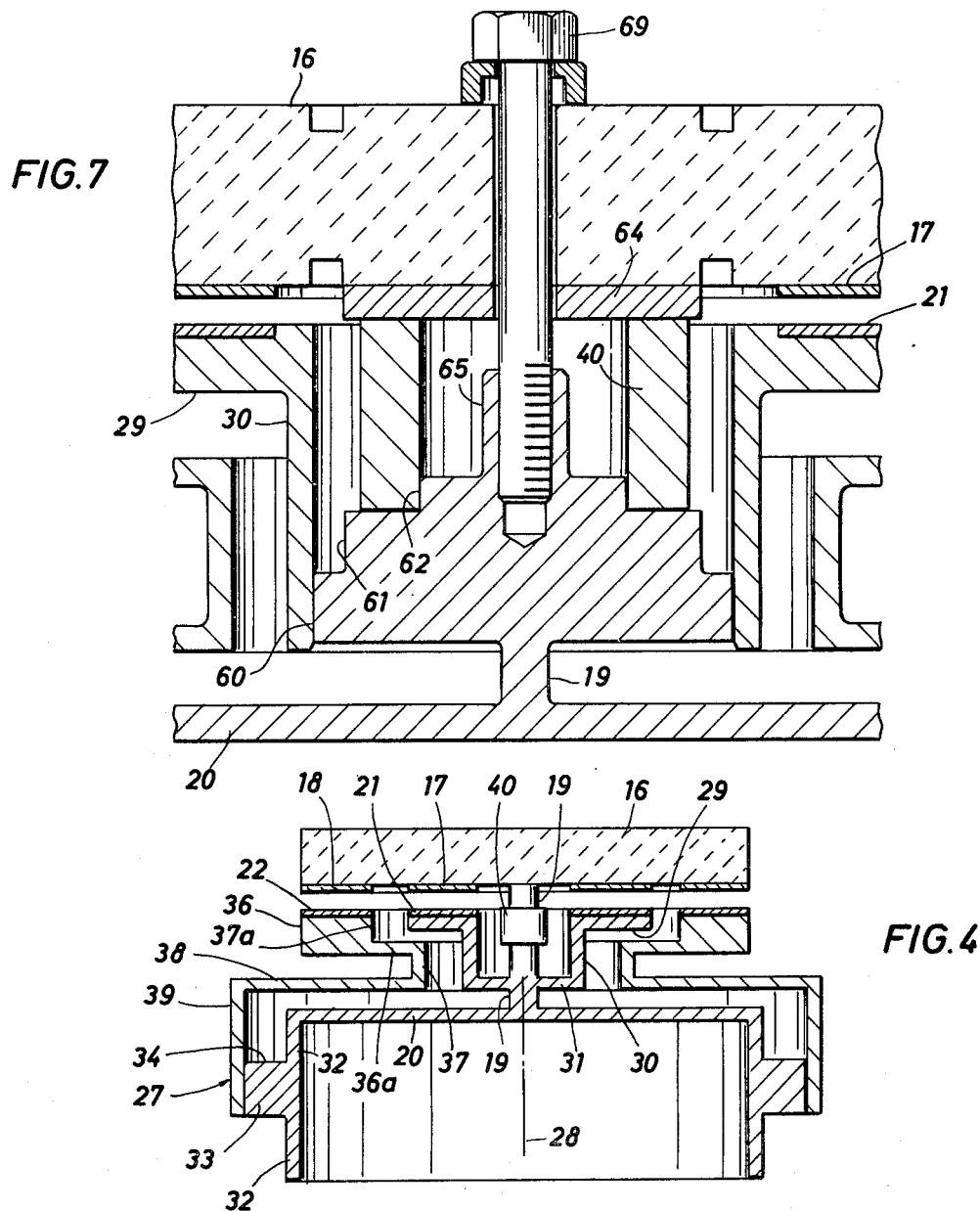
FIG. 7
FIG. 4
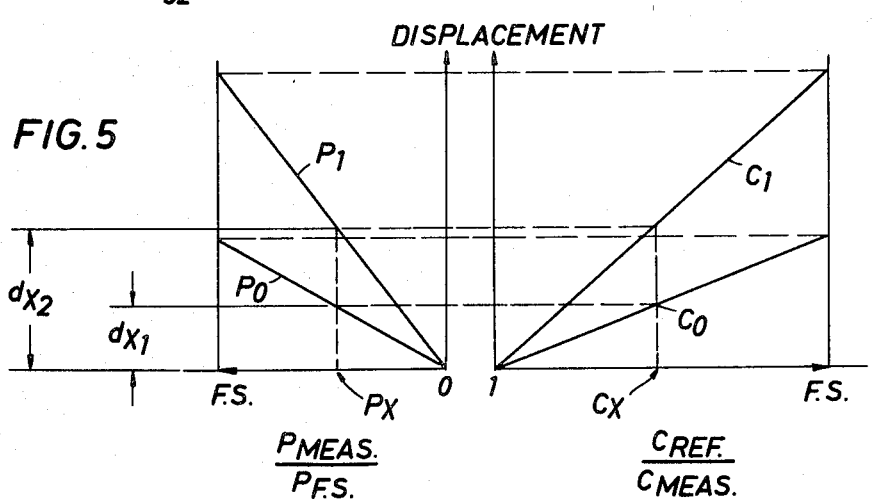
FIG. 5

PRESSURE SENSORS

This is a division of application Ser. No. 089,162 filed Oct. 29, 1979 now U.S. Pat. No. 4,322,775 issued Mar. 30, 1982.

THE PRESENT INVENTION

This invention relates to pressure measuring devices, and more particularly, to capacitance type pressure transducers for providing pressure measurements independent of temperature and positional location of the transducer.

Capacitance type transducers are commonly employed for pressure measurements. This type of pressure transducer operates on the principal of varying an electrical capacitance of a capacitor as a function of pressure and measuring the capacitance electrically to indicate the pressure. A capacitor typically consists of parallel electrically conductive plates which are spaced apart by a distance "D", a dielectric medium between the plates and a certain plate area of conductivity. The electrical characteristics of the capacitor are defined by the following relationship:

$$C = 0.0884(K)(A/D)$$

Where "C" equals capacitance in coulombs, "K" equals the dielectric constant, "A" equals the area of the plates in square centimeters and "D" equals the spacing between the capacitor plates in centimeters.

In a pressure transducer application, one of the capacitor plates of a capacitor is attached to a flexible diaphragm and by moving or flexing the diaphragm relative to the other capacitor plate, in response to pressure, the distance "D" is changed and this, in turn, produces an inverse effect upon the capacitance "C" which can be electrically measured. There are a number of factors which affect the accuracy of this type of measurement including: the change in the dielectric constant "K" by the introduction of a different atmosphere or medium between the capacitor plates; a change in the spring rate or "deflection characteristics" of the diaphragm because of a change in temperature; or construction of the unit with different materials so that temperature differentials produce an effect on expansion of the materials in the mechanical construction so that the materials have different expansion rates under the influence of a change in temperature. Capacitance type pressure transducers also are adversely affected by virtue of the distortion introduced by the non-linear response of the diaphragm surface with respect to the capacitance plates. Further, a drawback of most pressure transducers is that their relative positioning introduces gravitational forces which effect the response. Heretofore, I have developed a ratio-metric capacitance measuring system by which the desired capacitance measurement is made with respect to a reference capacitance measurement. Such a system eliminates variables such as the dielectric effect and additionally, provides a more accurate pressure measurement which is independent of instrumentation. Such a system is disclosed in my U.S. Pat. No. 4,091,683.

The present invention has for its object the elimination of errors of measurement due to changes of temperature on the measurement device, or due to a positioning effect on the mechanical construction in a capacitance type transducer.

To obtain these and other objects of the invention, the present invention includes a structure which has a number of independent design improvements which independently contribute to more accurate measurement systems.

In the present system, a reference and measuring capacitor are symetrically and co-extensively arranged relative to one another to respond identically with respect to changes in distance between the capacitor plates and with respect to a change of dielectric material. With fixed areas of the capacitor plates, the displacement distance "D" of the plates has an inverse relationship to the capacitance "C." In the construction of the present pressure transducer, the system is designed by choice of materials and their coefficients of thermal expansion so that, as the temperature may change and affect the spring rate of the sensor diaphragm, the capacitance is altered by changing the spacing "D" between the plates and maintains a calibrated relationship of the capacitance "C" to the spacing distance "D" as a constant which is independent of a change in temperature.

In the construction of the present invention, the upper and lower capacitor plates for the reference measuring capacitor are symetrical with respect to one another and mounted relative to one another by a center post. The center post construction includes an expansion element selected of metal which has a linear expansion in response to temperature relative to the expansion in response to the temperature of the remaining materials. By calculating the sensitivity of the diaphragm in terms of the displacement of the pressure sensing element as a function of temperature relative to the displacement response of the center post as a function of temperature, the change in capacitance can be accurately correlated with spring rate as a function of temperature. That is, for a given change of temperature, the effect on the spring rate of the pressure diaphragm is compensated for by a change in capacitance so that the calibration of the measurement is constant. Mechanically, the expansion element in the center post is designed to expand relative to temperature so that it will produce change in the distance between the capacitor plates (and thus the capacitance) to maintain the original capacitance distance relationship.

To further eliminate the effects of temperature upon the pressure measurements made by the pressure transducer, the thermal impedance paths to each of the condensor plates are adjusted so as to provide for relatively equal displacements due to transient temperature distribution so that the transducer is uniformly effected by temperature rather than subject to differing temperature effects within the unit.

The mechanical construction of the unit is provided with mechanical structural isolation and innerconnections so that capacitance plates are relatively insensitive to positioning changes. The entire unit is enclosed within a protective vacuum atmosphere to thermally isolate the internal structure as well as providing a vacuum reference.

In another embodiment of the invention, the diaphragm constitutes a common capacitor plate. The rate of expansion of the ceramic base for the other capacitor plate is correlated to the rate of expansion of the housing supporting the other capacitor plate so that as the displacement characteristics of the diaphragm change as a function of temperature, spacing of the capacitor plates is altered by a defined function to maintain the response of the capacitor independent of a change in temperature.

DESCRIPTION OF DRAWINGS

The foregoing invention as well as the objects of the invention will be best understood when taken in connection with the following drawings in which:

FIG. 4 is a schematic illustration of another aspect of the present invention;

FIG. 5 is a graph of relationships utilized by the invention;

FIG. 7 is an enlarged view in cross-section of the temperature compensation of the present invention.

DESCRIPTION OF THE PRESENT INVENTION

Figure 1:
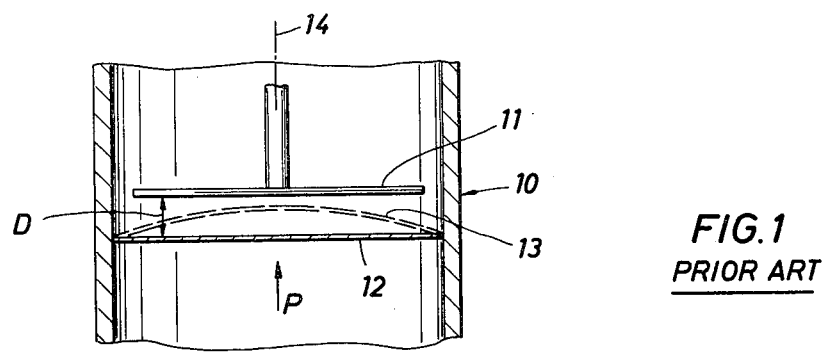
FIG. 1 is an illustration of a Prior Art transducer.

Referring now to FIG. 1, a prior art capacitance type pressure transducer 10 is illustrated for explanation purposes. In the device as illustrated, there are upper and lower electrical capacitor plates 11 and 12. At zero pressure measurement, the plates 11 and 12 are separated physically by a uniform distance "D." The plates 11 and 12 are cylindrical and plate 12 also serves as a diaphragm for responding to pressure. As indicated heretofore, the capacitor relationship is:

$$C = 0.0884(K)(A/D)$$

As is indicated by the dashed line 13 in FIG. 1, when the diaphragm 12 is flexed in response to a pressure "P," the distance "D" between the capacitor plates decreases and becomes non-uniform. The surface relationship between the plates also becomes non-linear so that a distortion is introduced into measurement of the capacitance. The general configuration of the elements of FIG. 1 is symmetrical about the vertical central axis 14.

Figure 2:
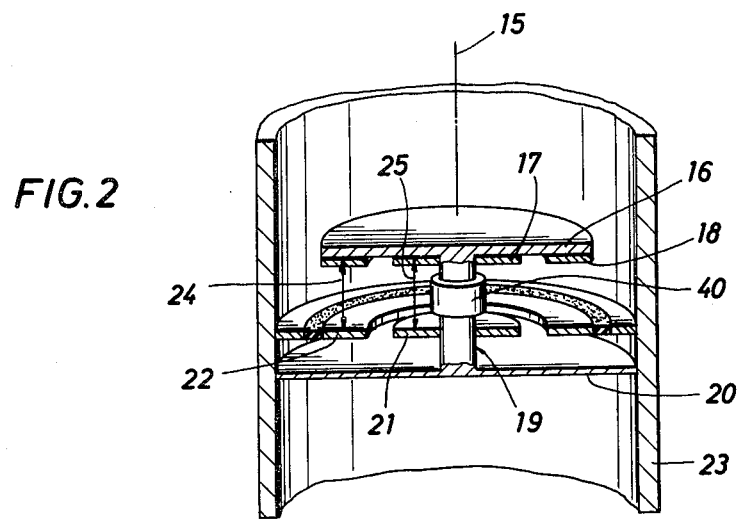
FIGS. 2 and 3 are schematic illustrations of certain aspects of the invention.
Figure 3:
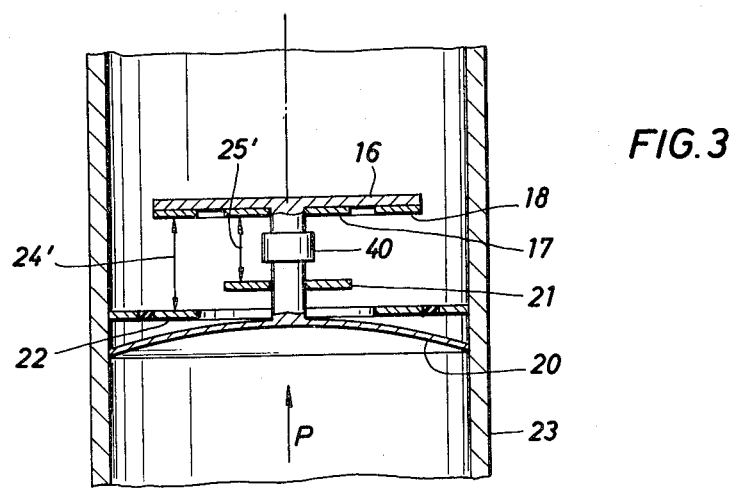

Referring now to FIGS. 2 and 3, a principle of the present invention is illustrated schematically with an upper capacitor support 16 having concentric, annular, electrically conductive ring capacitator plate members 17 and 18 which are disposed about a vertical axis 15. The upper support 16 is supported by a center post 19 connected to the center of a cylindrically shaped diaphragm 20. There are lower concentric, annular, electrically conductive ring capacitor plate members 21 and 22 which are respectively mounted on the center post 19 and an outer housing 23. The plate members 21 and 22 are parallel to the upper plate members 17 and 18. In a "zero" or base reference pressure and temperature condition, the physical spacing 24 and 25 between the respective pairs of capacitor plate members is uniform and equal. The plate members 17 and 21 are first upper and lower capacitor plate means spaced from one another in a fixed spacial relationship so as to constitute a reference capacitor while the plate members 18 and 22 are second upper and lower plate means spaced from one another in a variable special relationship so as to constitute a measurement capacitor. As noted, in U.S. Pat. No. 4,091,683, the ratio of capacitance measurements between the reference and measurement capacitors provides for reference of measured capacitance to a base capacitance. In the illustration of FIG. 2, under constant temperature conditions, the physical distance identified by the number 25 will remain constant while the physical distance identified by the number 24 can be increased as a function of pressure applied to the diaphragm 20. Thus, as illustrated in FIG. 3, with applied pressure, the distance 24' is increased in response to such pressure while the distance 25' is maintained constant.

It is because of the mounting of plate members 17 and 21 on the center post 19 that the distance 25 and 25' can be maintained constant independent of pressure. At the same time, the surfaces of the plate members 18 and 22 also remain parallel to one another because they are mounted independently of one another. In particular, a non-linear deflection of the diaphragm surface 20 does not affect the parallel capacitance relationship between the surface of the plates but rather produces only a displacement relationship between the measurement plate members.

Moving into another aspect of the present invention which is illustrated in FIG. 4, a structural body member 27 is concentrically arranged about a vertical central axis 28. Common numbers are used with respect to similar elements previously discussed with respect to FIGS. 2 and 3. In FIG. 4, an upper horizontal base plate 16 constructed of ceramic material has concentric electrically conductive capacitance plate ring members 17, 18 and is mounted on the center post 19 which is attached to the center of the horizontal cylindrically shaped diaphragm 20. The plate members 17, 18, 21 and 22 are dimensioned to have equal surface areas.

The lower, electrically conductor plate ring member 21 is supported upon a horizontal flange 29 which couples to a vertical tubular section 30 which couples to a lower radially extending, horizontal flange 31 which is a part of the center post 19. The capacitor plates 17, 18 and 21 are thus commonly supported by the diaphragm 20, post 19, section 30, flange 29 and by the base plate 16 about a central axis 28. The diaphragm 20 at its outer edge couples to a vertical tubular section 32. The vertical tubular section 32 has an outwardly extending radial flange 33. The upper surface 34 of the radial flange 33 defines a horizontal plane of reference and from this horizontal plane there is a first heat path through the tubular section 32 above the flange 33, through the horizontal diaphragm 20, through the vertical post 19, through the horizontal flange 31, through the vertical tubular section 30, and through the horizontal flange 29 which supports the plate ring member 21.

The lower electrically conductive plate ring member 22 is supported on a horizontal flange 36 which has an internal recess 37a. The flange 36 couples to a horizontal flange 36a which couples to a vertical tubular section 37 which couples to a horizontal diaphragm 38 which couples to an outer vertical tubular section 39 which couples to the radial flange 33. The capacitor ring member is supported relative to the plate member 21 by the horizontal flange 30, tubular section 37, diaphragm 38 and a tubular section 39. From the horizontal plane of reference at the upper surface of the radial flange 33, there is a second heat path through the vertical section 39, diaphragm 38, vertical section 37, horizontal flange 36a to the horizontal flange 36 which supports the plate member 22.

The first and second heat paths as described above are equalized with respect to expansion by use of metals having the same characteristics. Further, the expansion matching eliminates the steady state temperature response while the thermal impedance matching eliminates the transient temperature response. The impedance or resistance to the passage of heat is such that a change of temperature occuring with respect to the plane of reference will affect the relative position of the plate members 21 and 22 equally with respect to expansion. Thus, inaccuracies due to temperature differentials on the elements can be minimized.

With respect to position, the elements 16, 19 and 20 (together with the components thereon) have a first mass which has a bearing on the position of the plate member 21 and base plate 16 relative to the diaphragm 20. In other words, if the device is turned upside down, gravity has an effect on the relative positioning of the elements. The elements 36, 37 and 38 (together with the components thereon) have a second mass which also has a bearing on the position of the plate member 22 relative to the diaphragm 38. By proportioning the relationship of mass and the diaphragms, 20 and 38, the plate members 21 and 22 are equally affected by any position change of the transducer and thus the relative accuracy of the capacitor spacing remains constant.

Referring again to FIGS. 2 and 3, the center mounting post 19 is illustrated with a thermal compensator 40. The relationship and function of the thermal compensator 40 relative to the capacitance and diaphragm may be explained by reference to FIGS. 2, 3 and 5. For a base reference condition of pressure and temperature, the capacitor device as shown in FIG. 2, has the relationship of $$C = 0.0884(K)(A/D)$$

which can be redefined to (C) (D)=Constant and the capacitance "C" and distance "D" are thus inversely related to one another.

In FIG. 5, the slope line $C_o$ defines the relationship of a capacitance ratio on a horizontal scale to displacement of the diaphragm 20 on a vertical scale for a constant temperature $t_o$. The capacitance ratio is the reference capacitance divided by the measured capacitance from a static base condition of one (1) to full scale deflection of the diaphragm. For the same temperature $t_o$, there is a pressure relationship on a horizontal scale which is correlatable to displacement of the diaphragm on a vertical scale for the constant temperature $t_o$. The pressure ratio is the measured pressure value divided by the full scale pressure value required to obtain full scale deflection of the diaphragm. The pressure displacement relationship is based upon the spring rate of flexibility of the diaphragm and is defined by the slope line $P_o$. Thus, for a given spring rate of a diaphragm at a temperature $t_o$, a given pressure/displacement relationship $P_o$ exists, and a defined capacitance/displacement $C_o$ relationship exists.

If the temperature is increased from $t_o$ to a higher temperature $t_1$, then the spring rate of the diaphragm changes and a slope line relationship as illustrated by $P_1$ exists. The compensator 40 serves the function of changing the distance (and hence the capacitance) between the capacitor plates 17 and 21. The compensator 40 serves to change the distance between the capacitor plates so that the defined capacitance/displacement relationship $C_1$ is altered to compensate for the change in spring rate because of the increase in temperature. As an example, for a pressure value of $P_x$ temperature $t_o$, there is a physical diaphragm displacement $d_{x1}$ and a capacitance value of $C_x$. For the same pressure value of $P_x$ and an increased temperature to $t_1$ the diaphragm is $d_{x2}$ but the compensator 40 changes the spacing between the capacitor plates 17 and 21 so that the diaphragm displacement is $d_{x2}$ and so that the capacitance ratio value remains at $C_x$.

Figure 6:
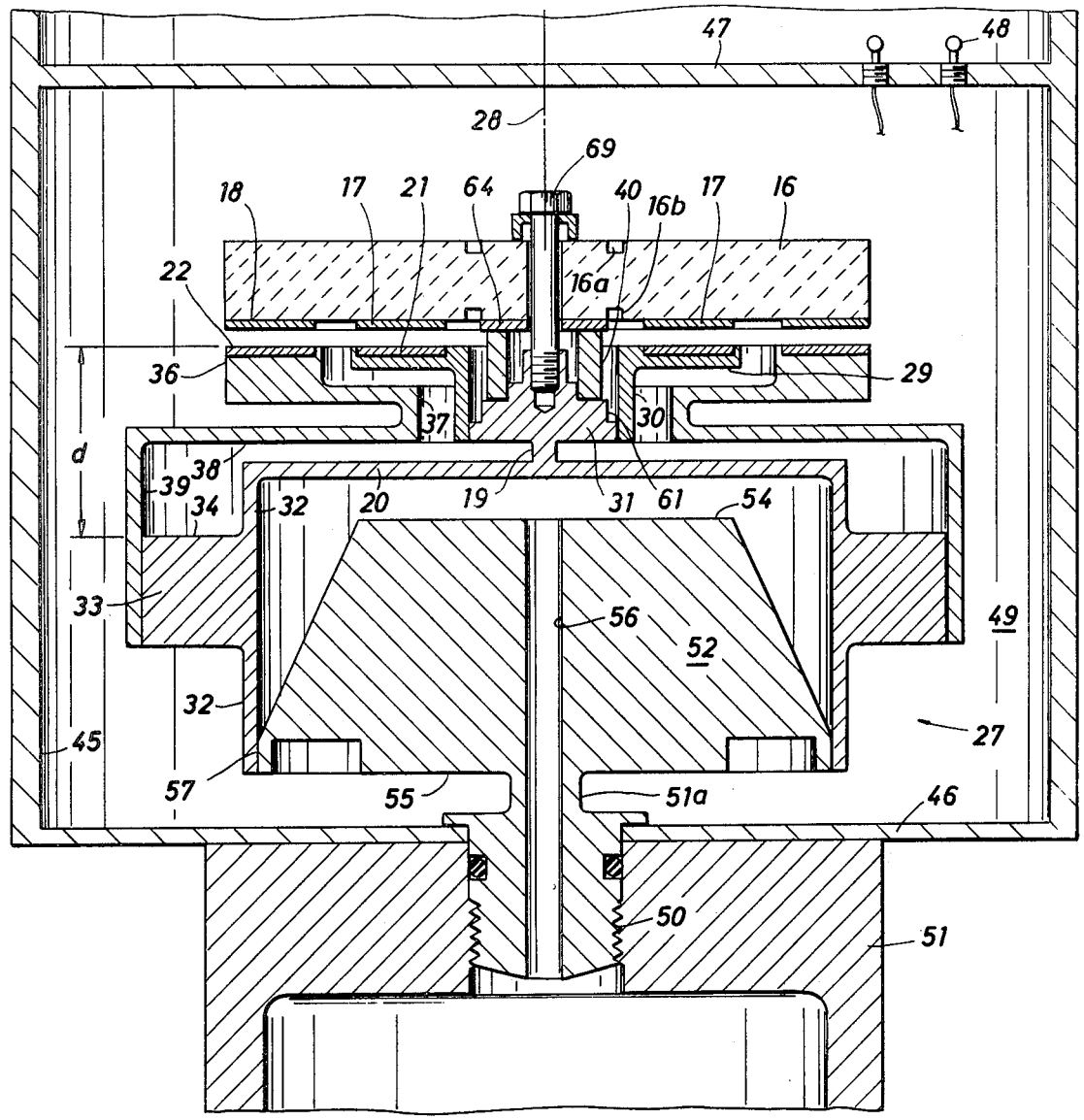
FIG. 6 is a view in cross-section of an embodiment of the invention.

A more detailed embodiment for the foregoing systems is illustrated in FIG. 6. Similar numbers are used for corresponding elements which have previously been described. In FIG. 6, the body member 27 is enclosed within a tubular housing member 45 which has a lower transverse and horizontal closure wall 46 and an upper transverse and horizontal closure wall 47. The upper closure wall 47 has electrical terminal connections 48 through the wall which are not shown as connected to the conductor plates to simplify the illustration in the drawing. Electronics for the system are contained in the housing member 45 above the horizontal wall 47. The interior 49 of the housing enclosure is maintained at a vacuum atmosphere. The unit 27 has an exterior, threaded connector 50 which is threadedly and sealingly received in a pressure line connection 51 in which the pressure is intended to be measured.

Above the threaded connector 50, is a necked down post section 51a of reduced diameter. The reduced diametral section 51a serves to impede heat transfer and to stress isolate the structure supported by section 51a. The section 51a connects to a cylindrical shaped base member 52. The base member 52 has an outer tapered surface 53 between upper and lower horizontal face surfaces 54, 55. A pressure bore 56 extends through the base member 52 to provide fluid access to the horizontal sensor diaphragm 20.

The horizontal sensor diaphragm 20 is the upper horizontal wall of a cup-shaped member which has a vertical tubular wall 32 which is suitably attached and sealed to a lower base section 57 to provide an enclosed chamber to contain the measured pressure. As illustrated, a relatively short length 57 of the base member 52 contacts the vertical wall 32 so that the heat transfer is restricted to this coupling. Midway of the length of the vertical wall 32 is an outwardly extending radial flange 33 which serves as a support for the measuring plate 22 as well as a temperature isolation reference point.

The inner reference capacitor ring plates 17 and 21 and one of the measuring capacitor ring plates 18 are supported by a small diameter, cylindrical mounting post 19 attached to the diaphragm 20 along the central axis 28. The central post 19 is attached to the diaphragm 20 along the central axis 28. The central post 19 provides a stress isolation to isolate the diaphragm 20 from any friction component in the upper structure and thereby prevents the introduction of hysteresis into its deflection. The post 19 couples to a lower flange member 31 which has stepped diametral surfaces along its length. The largest diametral surface 60 (FIG. 7) at the lower end of the flange member 31 is coupled to the lower end of the vertical tubular member 30 which extends upwardly to an outwardly extending horizontal flange 29. The upper surface of the flange 29 is the electrode member 21. The next diametral section 61 is reduced in diameter and provides a clearance space with respect to the vertical wall 30. On the next diametral section 62 is an annular thermal compensator spacer member 40. A spacer 64 is disposed between the member 40 and the plate member 16. The upper plate 16 is cylindrically shaped and is attached to the flange 31 by means of a threaded bolt 69. On the lower surface of the plate 16 are concentric silver plate ring members 17 and 18 which provide the upper capacitor plates. The ceramic plate 16 is provided with upper and lower annular groves 16a and 16b which extend partially into the body of the plate 16. The grooves 16a and 16b serve the function of eliminating transmission of distortion to the ring members 17 and 18. The distortion remedied by the grooves 16 and 16a is caused by radial or volumetric expansion of element 40 relation to the ceramic base 16. As illustrated, plates 17 and 21 are directly opposite to one another and are supported on the same post member and have a thermal compensator 40 in the support.

The outer capacitor plate 22 is mounted on a structure which includes a tubular member 39 coupled to the flange 33, a horizontal diaphragm wall 38 forming a mechanical diaphragm, a vertical tubular section 37 and an outwardly extending flange 36 on which the plate 22 is formed. The arrangement is such that the plates 18 and 22 are parallel and opposite to one another.

The foregoing structure achieves the stated objectives in operation. The diaphragms 38 and 20 and balancing of the masses which respectively affect the diaphragms permit the unit measurements to be independent of the position of the unit. That is, if plate 18 moves downward because of gravity, the plate member 22 moves downward an equal distance. In short, plates 18 and 22 are physically affected equally by position so that their distance relationship stays constant.

Heat distribution is handled by the vacuum atmosphere which effectively limits the heat input path to the center mounting of the overall structure. For applied heat changes, the time required for transfer of thermal energy from the plane 34 to the respective plate members 21 and 22 is equal so that there is an equal thermal effect on the plates. It will be appreciated that the effective thermal length between the plate 34 and plate members 21 and 22 can be controlled by adjusting the relative thickness of the walls 32 or 39 with respect to the remaining mass of the thermal path. The thermal length of the path is essentially equal to equal thermal transient expansion displacement relative to the plate members 21 and 22.

The structure, as noted before, maintains the condensor plate surfaces parallel to one another because the reference capacitor plates 17 and 21 move together and the outer plates 18 and 22 are mounted on independent references.

The temperature compensation is based upon a change in the physical spacing between the upper and lower sets of capacitor plates in relation to the change of spring rate of the sensor diaphragm 20 as a function of temperature. Stated functionally, as the temperature increases with respect to a base temperature, the diaphragm will become more resilient. This, in turn means that for a given pressure measurement, the capacitor plates 18 and 22 should be moved a greater distance apart. At the same time, however, the increase in temperature causes the capacitor plates 18 and 22 to move closer to one another because of expansion of the supporting metals. All of the metals of unit 27 are the same material to make the coefficient of expansion identical. The thermal compensator 40 is constructed of a different material having a similar characteristic of thermal expansion so that the relative expansion of compensator 40 relative to the other metal of the unit 27 is linear in response to a temperature change. By adjusting the physical parameters, the compensator 40 changes the spacing between the reference capacitor plates 17 and 21 and between the plates 18 and 22 so that even though the increased temperature permits the diaphragm to move the plates through a greater distance of separation, the compensator 40 increases the spacing between the plate by an appropriate distance so that the base relationship between the capacitance and distance is maintained substantially constant.

Figure 8:
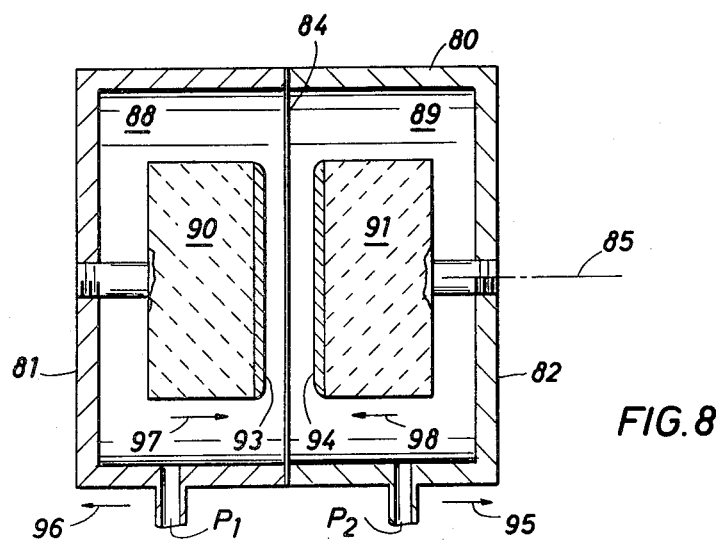
FIG. 8 is a schematic illustrative of another embodiment of the present invention.

Referring now to FIG. 8, another embodiment of the present invention and embodying the same thermal compensation concepts is illustrated. In FIG. 8, a tubular shaped housing 80 has end cap members 81 and 82. A centrally located electrically conductive diaphragm 84 separates the housing 80 into two pressure chambers 88 and 89 which receive pressure from inlets $P_1$ and $P_2$. In each of the chambers 88 and 89 is an identical ceramic, cylindrically shaped base support member 90 and 91. The ceramic members 90 and 91 are connected along a central axis by stub post members to the housing 80. The surfaces of the base members which face the diaphragm 84 are provided with a silver plate coating providing capacitor plates 93 and 94.

Diaphragm 84 is electrically conductive so that it forms a capacitor plate with respect to plate 93 and plate 94. The housing 80 is constructed from a common metal material thereby providing a defined co-efficient of expansion. The ceramic bases 90 and 91 also have defined co-efficient of expansion. The ceramic will not expand or lengthen as far as the housing will expand in response to temperature. By adjusting the dimensions of the housing and ceramic bases, the change in the gap or distance between the diaphragm 84 and the other plates 93 and 94 can be proportioned to the change in deflection characteristics of the diaphragm caused by temperature. It will be appreciated that as the housing expands in directions 95 and 96 that the ceramic bases 90 and 91 are expanding in opposite directions 97 and 98 respectively. Thus, as the temperature increases and the diaphragm 84 be-comes more flexible, the gap or distance between capacitor plate increases. The increase in gap is the ceramic bases so that a constant relationship of capacitance and distance independent of the change in pressure is maintained. The basis for the relationship is as explained with respect to FIG. 5, that is, the change in capacitor distance D is matched to the change in spring rate of the diaphragm 84.

While particular embodiments of the present invention have been shown and described, it is apparent that changes and modifications may be made without departing from this invention in its broader aspects, and, therefore, the aim in the appended claims is to cover all such changes and modifications as fall within the true spirit and scope of this invention.

I claim:
1. A pressure sensing transducer comprising;
   support means adapted for connection with a source of pressure for sensing a pressure parameter, said support means including a cylindrically shaped base member with a central connecting portion;
   first cylindrically shaped, horizontally disposed diaphragm means;
   means attaching said first diaphragm means to said annular base member;
   flange means disposed intermediate of said first diaphragm means for providing a heat dissemination point;
   first means supporting an upwardly facing first annular capacitor plate;

means for mounting said first supporting means on a central vertical axis of said first horizontal diaphragm means;

second means supporting an upwardly facing second annular capacitor plate;

means for mounting said second supporting means on said flange means including a horizontal diaphragm means;

thermal compensator means supporting a cylindrical, ceramic base member;

a first upper annular capacitor plate on said ceramic base member in facing relationship to said first annular capacitor plate;

a second upper annular capacitor plate on said ceramic base member in facing relationship to said second annular capacitor plate; and said thermal compensator means providing a change in spacing between the upper and lower capacitor plates as a function of temperature in relation to capacitance.

2. The transducer as defined in claim 1 wherein said capacitor device is constructed from a first metal material having a defined co-efficient of expansion, and said thermal compensator means is constructed from a second metal material having a defined co-efficient of expansion, said first and second metal materials being functionally interrelated with respect to their co-efficients of expansion so that the metals have a linear rate of expansion with respect to one another.

3. The capacitor device as defined in claim 2 wherein said upper and lower plate means are parallel to one another.

4. The capacitor device as defined in claim 3 and further including means for enclosing said capacitor device in a vacuum atmosphere.

5. A capacitor device for use in measuring pressure comprising:

first, upper and lower capacitor plate means spaced from one another in a fixed spacial relationship with respect to a central axis;

second, upper and lower capacitance plate means spaced from one another in a variable spacial relationship with respect to a central axis;

said device having first support means for commonly supporting said first upper and lower capacitor plate means in said fixed spacial relationship and for supporting one of said second capacitance plate means, said first support means being displaceable in a direction aligned with a central axis of said first support means in response to pressure; and said device having second support means for supporting the other of said second capacitance plate means in a variable spacial relationship with respect to said one of said second capacitance plate means where said variable spacial relationship is a function of displacement of said first support means.

6. The capacitor device as defined in claim 5 wherein said first upper and lower capacitance plate means have equal areas and said second upper and lower capacitance plate means have equal areas.

7. The capacitor device as defined in claim 6 and further including thermal compensator means disposed in said first support means and located between said first, upper and lower capacitor plate means; and pressure diaphragm means coupled to said first support means;

said thermal compensator means being responsive to a shift in temperature in said device to vary said fixed spacial relationship in relation to a function of the electrical capacitance of said first, upper and lower capacitor plate means.

8. The capacitor device as defined in claim 7 wherein said capacitor device is constructed from a first metal material having a defined co-efficient of expansion, and said thermal compensator means is constructed from a second metal material having a defined co-efficient of expansion, said first and second metal materials being functionally interrelated with respect to their co-efficient of expansion so that the metals have a linear rate of expansion with respect to one another.

9. The capacitor device as defined in claim 8 where said upper and lower plate means are parallel to one another.

10. The capacitor device as defined in claim 9 and further including means for enclosing said capacitor device in a vacuum atmosphere.

11. The capacitor device as defined in claim 10 and wherein said first support means has a mass equated to the mass of said second support means so that the spacing between said second upper and lower capacitance plate means is independent of gravity due to the positional orientation of said first and second support means.

12. The capacitor device as defined in claim 10 wherein said first support means and said second support means have equalized heat paths with respect to expansion so as to equally delay transfer of thermal changes to said first and second support.

13. The capacitor device as defined in claim 12 where said second support means has a mass equaled to the mass of said first support means so that the spacing between said second upper and lower capacitance plate means due to gravity is maintained independent of the positional orientation of said first support means.

14. A capacitor device for use in measuring pressure comprising:

housing means defining an enclosed pressure chamber wherein one wall of said chamber is a cylindrically shaped displaceable diaphragm having a central axis, first support means attached to said one wall and aligned with said central axis, said first support means including an upper support member, at least two annular capacitor plate means disposed concentrically on said upper support member with respect to said central axis, said first support means including a lower support member disposed between said upper support member and said one wall, annular capacitor plate means disposed on said lower support member in a capacitance relationship to one of said annular capacitor plate means on said upper support member to define a reference capacitor means, second support means attached to said housing means, said second support means including a second support member disposed between said upper support member and said one wall, annular capacitor plate means disposed on said second support member in a relationship to the other of said capacitor plate means on said upper support member to define a measurement capacitor means.

15. The capacitor device as defined in claim 14 wherein said capacitor plate means have equal areas.

16. The capacitor device as defined in claim 14 wherein thermal compensating means are disposed between said upper and lower support members, said thermal compensating means being responsive to a shift in temperature in said device to vary the distance between the capacitor plate means of said reference capacitor means as a function of the electrical capacitance of said reference capacitor means.

17. The capacitor device as defined in claim 16 wherein said capacitor device is constructed from a first metal material having a defined co-efficient of expansion, and said thermal compensator means is constructed from a second metal material having a defined co-efficient of expansion, said first and second metal materials being functionally interrelated with respect to their co-efficient of expansion so that the metals have a linear rate of expansion with respect to one another.

18. The capacitor device as defined in claim 17 wherein said upper and lower plate means are parallel to one another.

19. The capacitor device as defined in claim 18 and further including means for enclosing said capacitor device in a vacuum atmosphere.

20. The capacitor device as defined in claim 14 and wherein said first support means has a mass equated to the mass of said second support means so that the distance between the capacitor plate means of said reference capacitor is independent of gravity due to the positional orientation of said housing means.

21. The capacitor device as defined in claim 20 wherein said first support means and said second support means have equalized heat paths with respect to expansion so as to equally delay transfer of thermal changes to said capacitor means.

* * * * *